United States Patent [19]
Shively et al.

[11] Patent Number: 5,845,232
[45] Date of Patent: Dec. 1, 1998

[54] APPARATUS AND METHOD FOR DETECTING SPLICE OVERLAPS OR SPLICE GAPS IN A TIRE

[75] Inventors: Richard T. Shively, Munroe Falls; James R. Shively, Uniontown, both of Ohio

[73] Assignee: Measurement Systems, Incorporated, Akron, Ohio

[21] Appl. No.: 644,108

[22] Filed: May 10, 1996

[51] Int. Cl.[6] ................................................. G01M 17/02
[52] U.S. Cl. .................... 702/105; 73/146; 324/76.47; 324/76.55
[58] Field of Search ...................... 364/507, 506, 364/570, 573; 73/146, 462, 8; 356/430, 431; 702/105; 324/76.47, 76.55

[56] References Cited

U.S. PATENT DOCUMENTS

| | | | |
|---|---|---|---|
| 3,817,003 | 6/1974 | Monajjem | 51/281 |
| 3,849,942 | 11/1974 | Monajjem | 51/165 R |
| 3,914,907 | 10/1975 | Hofelt, Jr. et al. | 51/281 R |
| 4,523,143 | 6/1985 | Dvorak | 324/133 |
| 4,805,125 | 2/1989 | Beebe | 364/570 |
| 4,837,980 | 6/1989 | Rogers, Jr. | 51/165 R |
| 5,245,867 | 9/1993 | Sube et al. | 73/146 |
| 5,249,460 | 10/1993 | Dory et al. | 73/146 |
| 5,271,284 | 12/1993 | Still et al. | 73/865.8 |
| 5,639,962 | 6/1997 | Maloney | 73/146 |

*Primary Examiner*—James P. Trammell
*Assistant Examiner*—Demetra R. Smith
*Attorney, Agent, or Firm*—Reese Taylor

[57] ABSTRACT

An apparatus and related method for detecting splice gaps and splice overlaps includes a processor having a memory and a plurality of logic tables, wherein the processor is connected to an input/output terminal, a probe, an encoder and a motor which rotates a tire about an axis of rotation. The processor performs several different comparisons upon collected measurement data to reliably ascertain if a sudden change in tire uniformity has occurred. These tests involve comparison of successive data points with one another to determine whether an unacceptable rate of change in the tire uniformity has occurred. If an unacceptable rate of change has occurred, the processor provides such an indication to the input/output terminal.

13 Claims, 2 Drawing Sheets

APPARATUS AND METHOD FOR DETECTING SPLICE OVERLAPS OR SPLICE GAPS IN A TIRE

RELATED PATENT APPLICATIONS

None.

BACKGROUND OF THE INVENTION

This invention relates in general to tire uniformity monitors and relates in particular to monitors which detect sudden changes in the uniformity of a tire.

DESCRIPTION OF THE PRIOR ART

Variations or sudden changes in the diameter of a body, such as a tire, are known to cause undesirable vibrations when the tire rotates at certain speeds. These undesirable variations also cause steering disturbances and make for an uncomfortable ride for those individuals in the vehicle. It will also be appreciated that some vehicles are more susceptible than others to these undesirable variations.

Currently, there are numerous apparatuses and related methods for determining tire uniformity. Typically, a tire is rotated about its axis at a known speed in engagement with a loadwheel to simulate the normal forces encountered when the tire is in use on a vehicle. One or more probes measure various aspects of the tire, such as diameter, hardness values, runout and the like. These tire uniformity machines are also employed to determine aesthetic appearance, monitor the condition of the tire mold, establish wear characteristic databases of the tire and the like. As is well known in the art, these tire uniformity machines are also used in conjunction with grinders that can be employed to remove defects or high spots from the tire as needed.

One example of a tire uniformity machine is disclosed in Beebe, U.S. Pat. No. 4,805,125. This device collects measurement data and performs various analyses on the data. For example, selected data samples are related to a polynomial function which is then evaluated to determine maximum, minimum or peak-to-peak values of a measurement waveform.

Other devices, as revealed in Monajjem, U.S. Pat. Nos. 3,817,003 and 3,849,942, along with the devices disclosed in Hofelt, Jr. et al., U.S. Pat. No. 3,914,907 and Rogers, U.S. Pat. No. 4,837,980, generally disclose tire uniformity machines that determine the location of a defect and which employ grinding devices to remove the defect once located. As will be appreciated by those skilled in the art, these tire grinding machines easily remove imperfections that exceed a desired tire uniformity. Those tires with defects that are below the desired tire uniformity range require that the tire either be rejected or that the grinder remove a large quantity of material to minimize the impact of the defect.

Although the above-described tire uniformity machines and those tire uniformity machines with an attached grinder are presumably effective in their stated goals, it will be appreciated that none of the above devices are effective in determining whether a sudden change in tire uniformity and/or runout waveforms has occurred. It will be appreciated that a sudden change in tire uniformity, although within a normally acceptable overall range of tire uniformity, can still result in undesirable vibrations or steering problems in certain automobiles. Thus, such a change may be smaller than the low end of the specification for the tire, but, due to the harshness or suddenness of the change, may still cause a hard ride or vehicle vibration.

Most such sudden changes in tire uniformity are caused by either a splice gap or a splice overlap in the tire tread. The gap or overlap in the tire tread occurs in the tire molding operation when a pre-cut section of tread is wrapped around a tire carcass and molded thereto. In instances where the length of the tire tread is too short, a gap develops between the two ends which causes what is hereinbelow referred to as a "splice gap." In contrast, when the tire tread is too long, a "splice overlap" is created.

In either case, the sudden change in runout characteristics will occur.

Therefore, it has become apparent that it is desirable to have an apparatus for detecting anomalies in the uniformity of a body and related methods which provide a pass/fail indication of whether there is an undesirable rate of change in the uniformity of a body. It is also desirable for this apparatus to determine whether the sudden rate of change is due to a splice gap or a splice overlap.

SUMMARY OF THE INVENTION

It has been found, therefore, that an apparatus for detecting anomalies in a body and a related method can be provided which detects sudden changes in the uniformity of a body, such as a tire. In particular, the apparatus rotates the body about a fixed axis and collects a series of successive data points corresponding to a physical parameter of the body. The apparatus then compares one data point of the series of successive data points with another data point of the series of successive data points to determine a change in the physical parameter. Moreover, the apparatus then determines whether the change in the physical parameter exceeds a predetermined range of acceptable change in the physical parameter.

Specifically, it has been found that the apparatus can compare a plurality of the data points from the series of successive data points to one of the series of successive data points to determine the change in the physical parameter. In other words, a first successive data point is compared to a next successive data point to determine the change in the physical parameter. Accordingly, it will be appreciated that a third and a fourth successive data point can be compared to the first data point to determine any change in the physical parameter. It will be appreciated that by carefully selecting the number of intervals between which data points are compared, an accurate determination of the change in tire uniformity can be determined.

Accordingly, use and operation of an apparatus for detecting anomalies in a body, as described above, becomes the principal object of this invention with other objects thereof becoming more apparent upon a reading of the following brief specification considered and interpreted in view of the accompanying drawings.

BRIEF DESCRIPTION OF THE PREFERRED EMBODIMENTS

Figure 1:
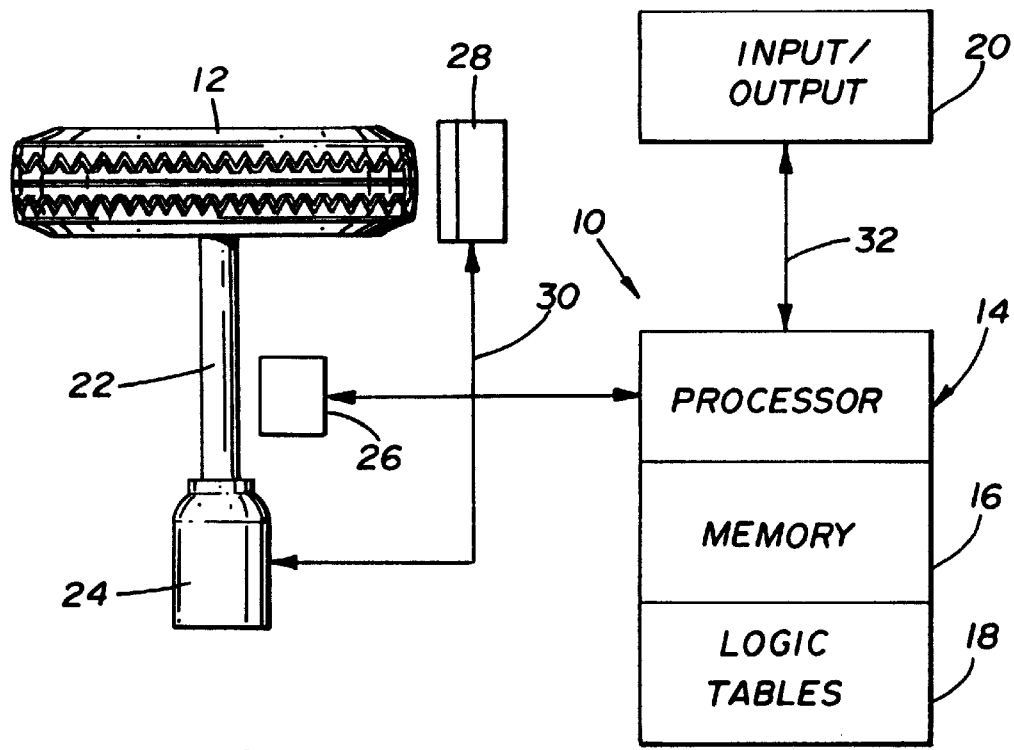
FIG. 1 is a schematic diagram of the apparatus.

FIG. 1 depicts an apparatus, generally indicated by the numeral 10, which performs a method for detecting anomalies in a body, such as a tire 12. The apparatus 10 includes a processor 14 which has a memory 16 and a plurality of logic tables 18. The processor 14 is capable of performing the necessary operations described in further detail below. It will be appreciated that the processor 14 incorporates the necessary hardware and software to control various components of the apparatus 10 and to monitor operation thereof.

Generally, the apparatus 10 is employed in conjunction with known tire uniformity machines for the purpose of detecting splice gaps or splice overlaps in a tire after a tire tread has been molded to a tire carcass. Inasmuch as tire uniformity machines per se are old and well known in the art, only such portions of such a machine as are necessary to understand the present invention will be illustrated and described herein.

An input/output terminal 20 is connected to the processor 14 for the purpose of displaying input prompts and output results related to the operation of the apparatus 10. In particular, a technician inputs test parameters, tire identifying information, process limits and other such input information needed to operate the apparatus 10. The input/output terminal 20 also displays the results obtained from the operation of the apparatus 10. It will also be appreciated that the input/output terminal 20 can collect data over several tire manufacturing runs to provide a detailed analysis of various aspects of a tire.

As schematically shown in FIG. 1, an axle or spindle 22 rotatably receives the tire 12 in a manner well known in the art. A motor 24, which is connected to the processor 14, functions to rotate the spindle 22 and the mounted tire 12 at a predetermined speed, typically about 60 revolutions per minute.

An encoder 26, which is connected to the processor 14, is juxtapositioned near the spindle 22 for the purpose of monitoring the rotation of the tire 12 and for providing a constant indicia of the instantaneous position of points on the outer surface of the tire 12. A probe 28, which may be of the contacting or non-contacting variety, is juxtapositioned near the surface of the tire 12 to obtain the appropriate measurement data therefrom. As is well known, the probe 28 can be employed to determine the dimensional distance from the center of the tire 12, or it can be employed to sense changes in the hardness or softness of the tire tread as the tire is rotated about its axis. Various types of probes may be employed, such as laser probes, loadwheels, rotating sensors, and the like.

In any event, the probe 28 generates a measurement signal 30 that is received by the processor 14 to provide the measurement data. Upon completion of the testing performed by the processor 14, a pass/fail signal 32 is transmitted to the input/output terminal 20 for display. It will be appreciated that the encoder 26 correlates the position of the probe 28 with respect to a particular point on the tire 12. In other words, if it were desired to obtain 100 data points along the circumference of the tire, the processor 14 would instruct the encoder 26 and the probe 28 to obtain a measurement once every 3.6°.

It will be appreciated then that the processor 14 is connected to the probe 28 for the purpose of retrieving measurement data and to the encoder 26 to obtain positional data of the spindle 22. The processor 14 further controls the actuation of the motor 24 and receives the appropriate signals from the encoder 26 such that the exact rotational position of the tire 12 is always known. The processor 14 correlates the rotational position of the tire 12 and the position of the non-contacting probe 28 to generate a tire measurement plot or waveform, as exemplified in FIGS. 2 and 3. Those skilled in the art will appreciate that these tire waveforms or plots can be representative of various positions of the tire, such as the radial, lateral or any of the runout channels from a known tire uniformity machine. Other such waveforms or plots can be representative of a radial force variation channel, a lateral force variation channel, a top radial runout channel, a center radial runout channel, a bottom radial runout channel, a lateral runout channel and an average radial runout channel to name a few.

Figure 2:
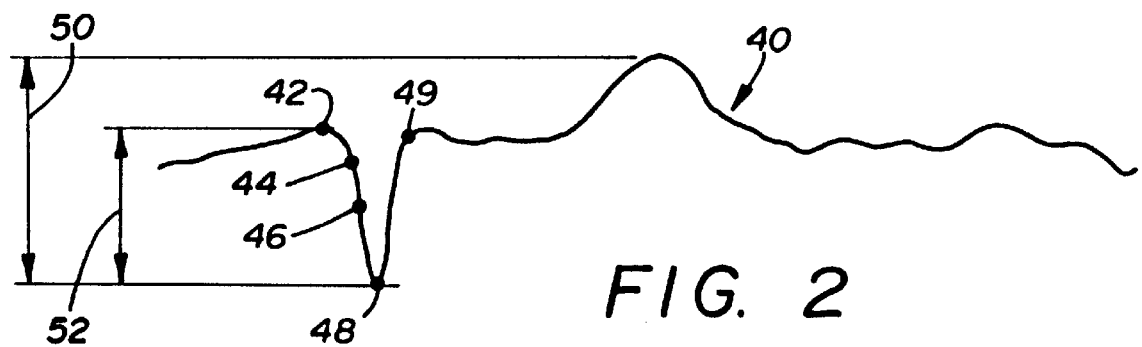
FIG. 2 is an exemplary measurement plot showing a splice gap in a body.

FIG. 2 illustrates a tire waveform which is representative of the measurement signal 32 and which is represented by a series of successive data points 40. As those skilled in the art will appreciate, the series of successive data points 40 are represented by at least a point 42, a point 44, a point 46, a point 48 and a point 49. Also shown in FIG. 2 is a range of tire uniformity 50 that is also known as the peak-to-peak value of any runout channel. The peak-to-peak value is typically employed to determine whether the tire 12 meets the acceptable physical parameters of the tire. A range of change 52 is also illustrated in FIG. 2 and represents, in this example, where there is a splice gap on the circumference of the tire 12. In other words, the data point 42 represents one end of a tire tread and the data point 49 represents the other end of the tread after the molding operation. The range of change 52 between the data points 42 and 48 and between the data points 48 and 49 represent a sudden change in tire uniformity. As such, although the range of change 52 is within the overall range of tire uniformity 50, the range of change may be determined by the processor 14 to be unacceptable due to its sharpness. If the range of change 52 is unacceptable, a fail signal 32 is transmitted from the processor 14 to the input/output terminal 20 to indicate the status of the tire 12. Of course, if the range of change 52 is acceptable, a pass signal 32 is transmitted to the input/output terminal 20.

Figure 3:
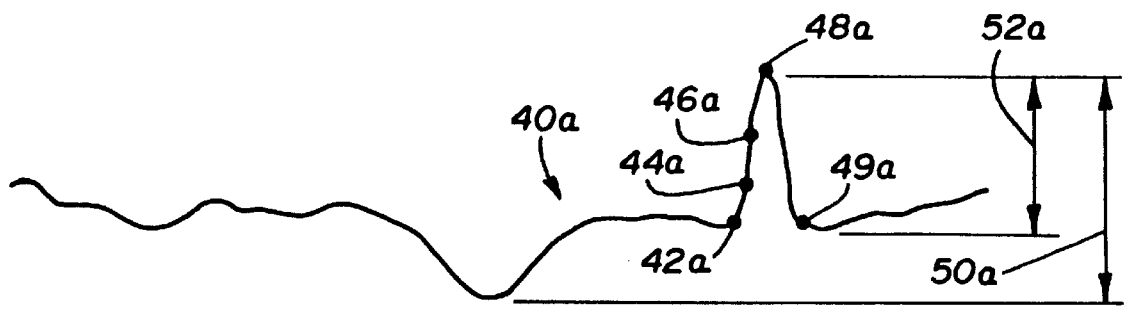
FIG. 3 is an exemplary measurement plot showing a splice overlap in a body.

FIG. 3 represents a tire waveform of a tire having a splice overlap condition. The splice overlap condition is represented by a series of successive data points 40a having exemplary data points 42a, 44a, 46a, 48a and 49a. As in the splice gap waveform, the splice overlap waveform has a range of tire uniformity 50a and a range of change 52a. In FIG. 3, data points 44a, 46a and 48a represent where one end of a tire tread overlaps the other end of the tread after the molding operation. As such, where the physical parameter or tire uniformity of the tire has a ridge or bump along the length thereof, the probe 28 detects this sudden change and transfers the series of successive data points 40a to the processor 14 for determination of the acceptability of the tire 12.

Figure 4:
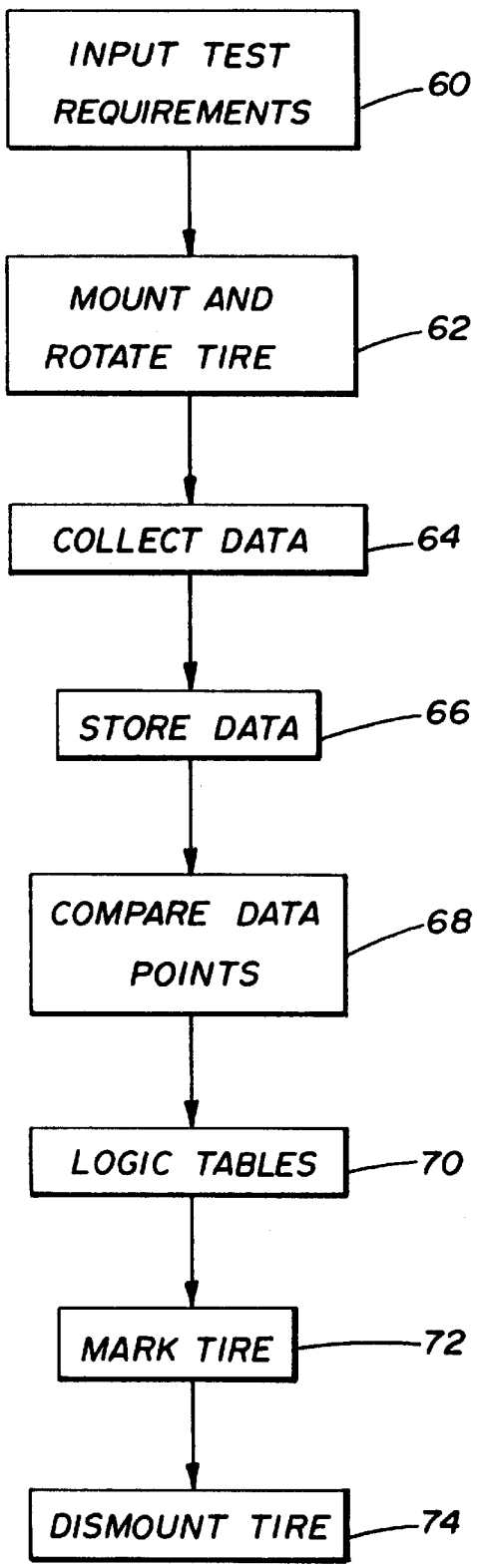
FIG. 4 is a top level flowchart of the operation of the apparatus and particularly a processor contained within the apparatus.

Operation of apparatus 10 may be most readily understood by reference to the exemplary waveforms shown in FIGS. 2 and 3 and the flowchart of FIG. 4. The processor 14, the memory 16 and the logic tables 18 perform a plurality of distinctly different operations upon the series of successive data points 40,40a to reliably ascertain if an unacceptable sudden change in tire uniformity has occurred. One test, which employs successive data point comparisons, involves a comparison of rates of change in a physical parameter, such as tire uniformity, at preselected measurement intervals as established by the encoder 26.

The comparison test begins by accepting input data from an operator that specifies the "window" in which the sudden change may occur. For example, the operator can instruct the processor to examine data points in 15° increments around the periphery of the tire to determine whether the range of change 52,52a in the window is acceptable or not. From this input information, the processor 14 determines how many points from the encoder 26 and the probe 28 should be checked for a change in amplitude or the range of change as represented by 52,52a. Afterwards, the processor 14 examines the data of the specified data channel (radial, lateral or any of the previously mentioned runout channels) and compares the data points 42–49 or 42a–49a for their respective change in amplitude. In other words, the processor 14 employs the memory 16 and logic tables 18 to determine the change or difference between successive data points. For example, the processor 14 compares one of the series of successive data points 40, for example, point 42, to a next successive data point 44 to determine the change in the physical parameter. It will also be appreciated that the processor 14 is capable of comparing the data point 42 to a second next successive data point 46, a third next successive data point 48, and so on. The memory 16 is capable of storing, in an appropriate buffer, a maximum difference found between these comparisons of data points and wherein this storage buffer is only updated when there is an increase in the change found between successive data points. At the end of the comparisons by the processor 14, the memory 16 and the logic tables 18 determine whether this maximum difference within the "window" or range of change 52,52a is acceptable or unacceptable and transmits the appropriate pass/fail signal 32 to the input/output device 20. Of course, other "window" sizes and comparison tests may be employed by the processor 14 to monitor unacceptable rates of change in tire uniformity.

Turning to the flowchart presented in FIG. 4, the operation of the apparatus 10 begins at step 60 with the input of the test requirements needed to operate the processor 14. Thereafter, the operator mounts the tire 12 onto the axle 22 and begins rotation of the tire 12 at step 62. At step 64, the processor 12 collects the measurement data from the appropriate runout channel. Next, the processor 14 stores the measurement data at step 66 and begins comparison of the data points 42–49 at step 68. Upon completion of the comparison of data points, the processor 14 submits these data points to the logic tables 18 at step 70 for determination of whether the change in the uniformity of tire 12 exceeds a predetermined range of acceptable change. Additionally, the logic tables 18 can also determine whether the tire 12 is within a predetermined range of acceptable tire uniformity. As discussed previously, it is possible for an unacceptable range of change in tire uniformity to be within the acceptable range of tire uniformity. Although many combinations of rates of change and tire uniformity can be input by the operator, it will be appreciated that, in the preferred embodiment, the acceptable predetermined range of change in the physical parameter is about 0.025 inch and the acceptable predetermined range of tire uniformity is about 0.030 inch. Upon completion of this determination, the processor 14, at step 72, transmits a pass/fail signal 32 to the input/output device 20, indicating to the operator whether to mark the tire 12 as a passed or rejected tire. Upon completion of the test to determine whether a splice gap or splice overlap exists, the operator, at step 74, dismounts the tire from the axle 22 and begins another test.

It is apparent then from the above description of the structure and operation of the apparatus 10 that the problems and shortcomings associated with previous tire uniformity machines have been overcome. In particular, the apparatus 10 provides a method for detecting splice gaps and splice overlaps in the tread of a tire 12. This feature is advantageous in that undesirable vibrations and noise are precluded when using tires with splice gaps or splice overlaps on particular automobiles. The above described method is also advantageous in that a simple and quick calculation determines whether a rate of change in tire uniformity is unacceptable or acceptable. It will be appreciated that other tire uniformity machines may use complex Fourier or other mathematical algorithms to determine whether a rate of change is acceptable and wherein these methods require much longer computational times to determine the same. Although these differences in computational time may be minimal, it will be appreciated by those skilled in the art that a time savings of several seconds in the manufacture of a tire can result in a substantial cost savings when large quantities of tires are manufactured.

Another advantage of the apparatus 10 and related methods of use is that a plurality of runout channels can be employed to detect changes in tire uniformity and that various data from the measurement waveform can be employed in different tests to determine whether the overall tire uniformity is acceptable or not.

While a full and complete description of the invention has been set forth in accordance with the dictates of the patent statutes, it should be understood that modifications can be resorted to without departing from the spirit hereof or the scope of the appended claims.

For example, the invention has been described in the context of a tire uniformity machine. However, it is believed apparent that the operational method could be readily adapted to provide an indication of sudden changes in the uniformity of other bodies. Moreover, the invention has been described in the context of dimensional uniformity. However, it should be appreciated that other physical properties, such as hardness, could be monitored.

What is claimed is:

1. A method for detecting anomalies in a toroidial body, comprising the steps of:

a) continuously rotating the body about a fixed axis;

b) collecting a series of successive data points around the circumference of the body corresponding to a physical parameter of the body;

c) comparing one of said series of successive data points with another of said series of successive data points to determine the rate of change in the physical parameter; and d) determining whether said rate of change in the physical parameter exceeds a predetermined range of acceptable changes in the physical parameter.

2. The method of claim 1 wherein said step of comparing further includes the step of comparing a plurality of data points from said series of successive data points to one of said series of data points to determine said change in the physical parameter.

3. The method of claim 2 wherein said step of comparing further includes the step of comparing one of said series of successive data points to a next successive data point to determine said change in the physical parameter.

4. The method of claim 2 wherein said step of comparing further includes the step of comparing one of said series of successive data points to a next successive data point and to a second next successive data point to determine said change in the physical parameter.

5. The method of claim 2 wherein said step of comparing further includes the step of comparing one of said series of successive data points to a next successive data point, to a second next successive data point and to a third next successive data point to determine said change in the physical parameter.

6. The method of claim 2 wherein said body is a tire having an acceptable range of tire uniformity.

7. The method of claim 6 wherein said predetermined range of acceptable changes in the physical parameter is within said acceptable range of tire uniformity.

8. Apparatus for detecting anomalies in the uniformity of a toroidial body, comprising:
   a) means for continuously rotating the body at a predetermined speed;
   b) means for monitoring the uniformity of said rotating body around its circumference and generating a measurement signal proportional thereto;
   c) processor means for receiving said measurement signal and for monitoring said predetermined speed, storing said measurement signal for a predetermined number of data points corresponding to the body, comparing one of said predetermined number of data points with another of said predetermined number of data points to determine the rate of change in the uniformity of the body, determining whether said rate of change in uniformity of the body exceeds a predetermined range of acceptable change in the uniformity of the body and generating a corresponding pass/fail signal; and
   d) display means for receiving said pass/fail signal and displaying whether the body is within said predetermined range of acceptable changes.

9. The apparatus of claim 8, wherein said processor means further includes means for comparing a plurality of data points from said predetermined number of data points to one of said predetermined number of data points to determine said change in uniformity.

10. The apparatus of claim 9, wherein said processor means further includes means for comparing one of said plurality of data points to a next successive data point to determine said change in uniformity.

11. The apparatus of claim 10, wherein said processor means further includes means for comparing one of said plurality of data points to a next successive data point and to a second next successive data point to determine said change in uniformity.

12. The apparatus of claim 11, wherein said processor means further includes means for comparing one of said plurality of data points to a next successive data point, to a second next successive data point and to a third next successive data point and where said processor means determines if any of the comparisons to one of said plurality of data points exceeds a predetermined range of acceptable changes in the uniformity of the body.

13. The apparatus of claim 12, wherein said body is a tire having an acceptable range of tire uniformity.

* * * * *